US009524622B2

(12) United States Patent
Loveland et al.

(10) Patent No.: US 9,524,622 B2
(45) Date of Patent: Dec. 20, 2016

(54) SYSTEMS AND APPARATUS FOR THE LIGHT-BASED COMMUNICATION OF SERVICE ORDERS AND PERSONAL OBJECTS IDENTIFICATION

(75) Inventors: Damien Gerard Loveland, Richmond (CA); Lucas Leo Desiree Van Der Poel, Waalre (NL); Dragan Sekulovski, Eindhoven (NL); Arend Jan Wilhelmus Abraham Vermeulen, Drachtster Compagnie (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 760 days.

(21) Appl. No.: 13/254,501

(22) PCT Filed: Feb. 12, 2010

(86) PCT No.: PCT/IB2010/050659
§ 371 (c)(1),
(2), (4) Date: Sep. 2, 2011

(87) PCT Pub. No.: WO2010/100576
PCT Pub. Date: Sep. 10, 2010

(65) Prior Publication Data
US 2011/0316451 A1 Dec. 29, 2011

Related U.S. Application Data

(60) Provisional application No. 61/157,106, filed on Mar. 3, 2009.

(51) Int. Cl.
*G08B 5/36* (2006.01)
*H05B 37/02* (2006.01)
*G01S 13/74* (2006.01)

(52) U.S. Cl.
CPC ............... *G08B 5/36* (2013.01); *G01S 13/74* (2013.01); *H05B 37/0272* (2013.01)

(58) Field of Classification Search
CPC ..... H05B 37/00; H05B 37/02; H05B 37/0272; G01S 13/74
(Continued)

(56) References Cited

U.S. PATENT DOCUMENTS 6,016,038 A    1/2000  Mueller et al.
6,211,626 B1   4/2001  Lys et al.
(Continued)

FOREIGN PATENT DOCUMENTS

DE    102005029728 A1   1/2007
JP       H07240281 A    9/1995
(Continued)

*Primary Examiner* — D A Minh
(74) *Attorney, Agent, or Firm* — Meenakshy Chakravorty

(57) ABSTRACT

Light-based systems for communicating information associated with service orders and/or the identification of personal objects are disclosed. A personal mobile electronic communication device is used in conjunction with a communication network and a lighting controller to communicate service orders by lighting with one or more individually controllable luminaries in a lighting network. A personal mobile electronic communication device is, alternatively or additionally, used in conjunction with a communication network, a memory, and a lighting controller controlling to indicate by lighting whether there is an association between the personal mobile electronic communication device and a personal item.

13 Claims, 7 Drawing Sheets

(58) Field of Classification Search
USPC .......... 315/312; 705/15, 16; 455/418, 420; 340/539.32
See application file for complete search history.

(56) References Cited

U.S. PATENT DOCUMENTS

| | | | |
|---|---|---|---|
| 6,366,196 B1 | 4/2002 | Green et al. | |
| 6,674,364 B1* | 1/2004 | Holbrook et al. | 340/568.1 |
| 6,774,787 B1* | 8/2004 | Melbourne | G08B 21/24 |
| | | | 340/539.1 |
| 6,975,207 B1 | 12/2005 | Shmelzer | |
| 6,980,088 B2 | 12/2005 | Stambaugh | |
| 7,113,089 B2* | 9/2006 | Ho | 340/539.13 |
| 2002/0198986 A1* | 12/2002 | Dempsey | G01S 5/02 |
| | | | 709/224 |
| 2003/0088469 A1 | 5/2003 | Leifer | |
| 2006/0077056 A1* | 4/2006 | Bernal-Silva | G08B 13/14 |
| | | | 340/539.32 |
| 2006/0145830 A1 | 7/2006 | Comstock | |
| 2007/0030164 A1* | 2/2007 | Lim | 340/825.49 |
| 2008/0004985 A1 | 1/2008 | Kang | |
| 2008/0174425 A1* | 7/2008 | Torning | 340/540 |
| 2008/0290822 A1* | 11/2008 | Greene | H02J 17/00 |
| | | | 315/363 |
| 2009/0039150 A1 | 2/2009 | Lay | |
| 2010/0201897 A1 | 8/2010 | Saitoh et al. | |

FOREIGN PATENT DOCUMENTS

| | | |
|---|---|---|
| JP | 2001253396 A | 9/2001 |
| JP | 200563009 | 3/2005 |
| JP | 2006147183 A | 6/2006 |
| JP | 2007164559 A | 6/2007 |
| WO | 9859258 A1 | 12/1998 |
| WO | 2007072314 A1 | 6/2007 |
| WO | 2008152545 A1 | 12/2008 |

* cited by examiner

SYSTEMS AND APPARATUS FOR THE LIGHT-BASED COMMUNICATION OF SERVICE ORDERS AND PERSONAL OBJECTS IDENTIFICATION

TECHNICAL FIELD

The present invention is directed generally to lighting systems and apparatus suitable for communications. More particularly, the present invention is directed to light-based systems for communicating information associated with service orders and light-based systems for the identification of personal objects.

BACKGROUND

Digital lighting technologies, i.e. illumination based on semiconductor light sources, such as light-emitting diodes (LEDs), today offer a viable alternative to traditional fluorescent, HID, and incandescent lamps. Recent advances in LED technology coupled with its many functional advantages such as high energy conversion and optical efficiency, durability, and lower operating costs, has led to the development of efficient and robust full-spectrum lighting sources that enable a variety of lighting effects. For example, fixtures embodying these lighting sources may include one or more LEDs capable of producing different colors, e.g. red, green, and blue, as well as a processor for independently controlling the output of the LEDs in order to generate a variety of colors and color-changing lighting effects, as discussed in U.S. Pat. Nos. 6,016,038 and 6,211,626, incorporated herein by reference.

Recent developments in digital lighting technologies such as LED-based lighting systems, has made the precise control of digital or solid-state lighting a reality. Consequently, light-based systems are used today to visually communicate information to individuals. For example, patrons waiting to be seated at a dining establishment are often provided with pagers that visually indicate when the staff is ready to seat them.

While advances in digital lighting technologies has given rise to precisely controllable lighting, significant advances made in the field of mobile electronic communications has similarly led to the development of sophisticated personal mobile electronic communication devices such as personal digital assistants and cellular phones that enable individuals to receive and transmit messages in a multitude of formats including text, voice and image. The tremendous demand created by their wireless communications capabilities, convenient small size and relative low cost has consequently resulted in making personal mobile electronic communication devices ubiquitous.

Although the fields of mobile communications and solid-state lighting have seen great advances, systems that combine the use of controllable solid-state lighting and personal mobile electronic communications to further enrich communications are lacking. For example, controllable lighting is only marginally used in circumstances where verbal communication may be difficult. Such circumstances include, for example, crowded spaces such as restaurants and bars where high noise levels make oral communication of orders ineffective, resulting in service that may be out of order or frustratingly slow. Such circumstances also include, by way of example, gatherings where people are served beverages in similar looking glasses, making it difficult for individuals to distinguish between their beverage and their neighbor's beverage.

For example, waiter paging systems exist currently that include transmitters at tables for transmitting signals indicating the need to communicate with wait staff, page units carried by the wait-staff, and central units for receiving and relaying the transmitted signals to pager units. While such systems allow the wait staff sufficient mobility, these paging systems are, however, sub-optimal because they depend on patrons remaining in a particular location, typically a table. And if the transmitters in such paging systems were not tethered to the tables, providing patrons with more mobility, the paging systems would challenge the wait-staff to locate patrons.

Similarly, past attempts at addressing the problem of identifying one's personal item, such as a beverage glass, in circumstances where multiple persons present have items that appear similar or identical, have failed to leverage the advances made in both the controllable solid state lighting and mobile electronic communications fields. For example, attempts at solving this problem range from systems requiring battery powered glasses illuminated with different colors, to systems involving large illuminated surfaces capable of identifying objects, to systems requiring each person in such a circumstance to wear a colored elastic band that matches a similar band placed on his/her personal item. These solutions are, once again, sub-optimal because they either require the installation of expensive equipment such as large special-purpose surfaces, or otherwise require the very individuals that are to benefit from the solution to themselves participate in remembering a distinguishing feature associated with their personal item, such as a color.

SUMMARY

The inventors herein recognized that there is a real need in the art to combine advances made in the realms of controllable solid state lighting with advances made in the realms of mobile communications. More particularly, the inventors recognized that current solutions to communication problems in circumstances where verbal communication may be difficult do not leverage advantages provided by the advances in both the controllable solid state lighting and mobile electronic communications fields, choosing instead to focus on one at the exclusion of the other. Accordingly, a combination of controllable solid state lighting and mobile electronic communications disclosed herein has the capacity to provide particularly advantageous solutions in a multitude of circumstances where either technology operating alone is inadequate. Thus, the present disclosure is directed at systems and apparatus for light-based communication of information, for example, associated with service orders and/or personal object identification, using mobile electronic communication.

Some embodiments of the present invention involve the use of a personal mobile electronic communication device in an establishment to transmit a service order to a communication network also accessible to the establishment. For example, in a specific embodiment, the present invention involves the use of a cell phone in a bar to transmit a beverage order to the communication network also accessible to the establishment. The communication network may then cause the lighting network in the establishment to control individual luminaires in order to illuminate the individual placing the service order with a color corresponding to the beverage or other item ordered by the individual. This exemplary illumination would at once visually communicate to the service provider (1) the need to prepare a beverage or other order for the illuminated individual, (2)

the location of the individual within the premises, and (3) the specific order to be prepared for the individual. A system providing such communication makes it unnecessary for individuals to both wait in lines in order to place orders and orally communicate orders to service providers, both undesirable activities in crowded or noisy establishments.

Generally, in one aspect of the invention, a light-based system for communicating service orders includes a personal mobile electronic communication device, a processor, a communication network, and a lighting controller. The personal mobile electronic communication device transmits a signal indicating the location of the device and another signal indicating a service order. The processor, upon receiving information indicative of the location of the personal device from the communication network, approximately ascertains the location of the personal mobile electronic communication device. The communication network receives these signals and transmits, in response, an illumination command. The lighting controller receives illumination command transmitted by the communication network and controls an illumination proximate to the personal mobile electronic communication device by one or more individually-controllable luminaires within a lighting network such that the illumination visually indicates the service order. In an alternative embodiment, the personal mobile electronic communication device sends a signal from which the location can be determined. The personal mobile electronic communication device may emit a signal that contains no location information, but multiple detectors connected to the light-based system may calculate the location based on a comparison of signal arrival times at different detectors.

Other embodiments of the present invention involve the use of a personal mobile electronic communication device to identify a personal item associated with the carrier of the mobile communication device in a venue where other individuals are using similar items. Both the mobile communication device and the personal item of these embodiments are equipped with a component that facilitates its identification and its location. Such components may include, for example, RFID tags. In these embodiments, a determination of the absolute approximate location of both the personal item and the personal mobile electronic communication device is not necessary. It is sufficient, for example, if a determination of the personal item's absolute approximate location is coupled with a determination of the personal device's location relative to the personal item. When the device comes in close proximity to the personal item, such as a glass, sensors within the venue may detect this proximity and communicate it to a communication network accessible to the venue. The communication network according to this example, may then invoke the assistance of a processor in order to check a memory for an association between the proximally located device and item. The presence of an association may indicate a match between the carrier of the personal mobile electronic communication device and the item. Based on the existence of an association, a lighting controller, communicatively coupled to the communication network, could temporarily illuminate the item in order to indicate whether or not the device is associated with the item. In other words, the illumination would therefore indicate whether or not the item belongs to the carrier of the mobile device.

In another aspect of the invention, a light-based system for identifying personal items includes a personal mobile electronic communication device, a processor, a personal item, a memory, and a communication network. The personal mobile electronic communication device transmits a signal indicating a device identifier, and the personal item similarly transmits a signal indicating an item identifier. The communication network receives both signals, determines the device identifier and item identifier included within the received signals, and transmits both the identifiers. The processor receives the device identifier and item identifier transmitted by the communication network, approximately ascertains the location of the personal device, checks the memory for a pre-existing association between the device identifier and the item identifier, and generates an illumination command based upon whether such an association exists in the memory. The lighting controller receives the illumination command, and in response, controls an illumination proximate to the personal item by one or more individually-controllable luminaires within a lighting network. The illumination thereby indicates whether an association between the personal device and the personal item exists in memory.

Another aspect of the invention is a light-based system for identifying personal items that includes a personal item, a personal mobile electronic communication device, a communication network, and a lighting controller. The personal mobile electronic communication device further includes a memory, a receiver, a processor, and a transmitter. The personal item transmits a signal encoding an item identifier, which the receiver within the personal device receives. The processor within the personal device then determines the item identifier from the signal received by the receiver and checks the memory to determine if the item identifier exists within the memory. The processor generates a report dependent on whether the item identifier is found within the memory. The transmitter within the personal device then transmits a signal encoding the report and another signal indicating a location of the personal device. The communication network receives the two signals transmitted by the personal device's transmitter and transmits an illumination command. The lighting controller receives the illumination command, and in response, controls an illumination proximate to the personal item using one or more individually-controllable luminaires within a lighting network. The illumination thereby visually indicates whether the item identifier is included in the memory of the personal mobile electronic communication device.

There are several advantages to using a system in accordance various embodiments and implementations of the present invention to identify personal items. First, the exemplary system avoids the need to have individuals involved remember a specific distinguishing characteristic, such as a color, with respect to their item. And second, the exemplary system does not require the constant exhibition of such distinguishing characteristics. For example, unlike some currently existing systems, there is no need here to have each item involved perpetually illuminated with distinguishing colors. Hence, the use of the exemplary system in accordance with the present invention results in a savings in energy consumption.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

DETAILED DESCRIPTION

Reference is now made in detail to illustrative embodiments of the invention, examples of which are shown in the accompanying drawings.

Figure 1:
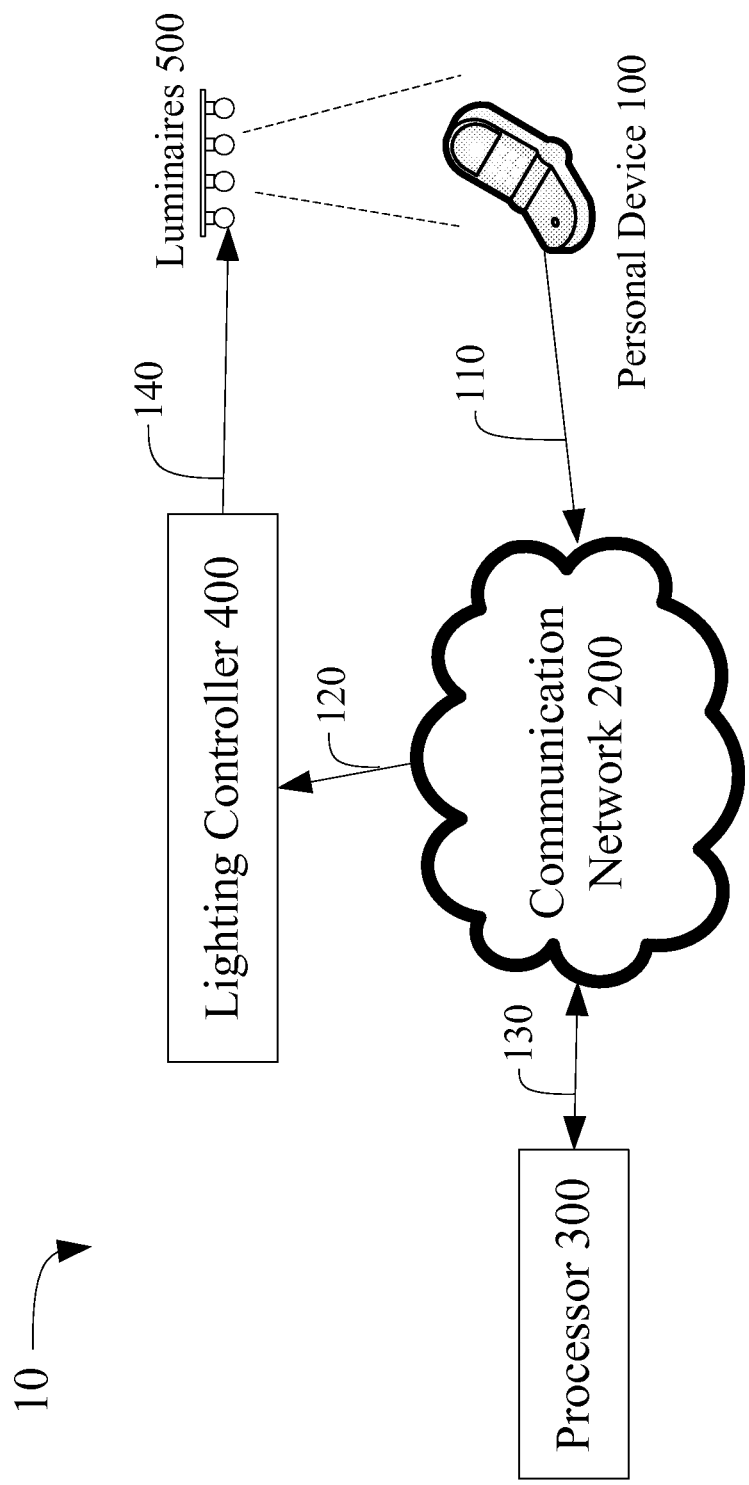
FIG. 1 illustrates a light-based system for communicating service orders according to some embodiments of the invention.

FIG. 1 illustrates a light-based system 10 for communicating service orders according to some embodiments of the invention. The system includes personal mobile electronic communication device (personal device) 100, communication network 200, processor 300, lighting controller 400, and one or more individually controllable luminaires 500 in a lighting network.

Personal device 100 transmits a first signal that relates to its location via link 110. The personal device also transmits a second signal that corresponds to a service order via link 110. Exemplary embodiments of suitable personal devices include a mobile phone, a SMS device, a personal digital assistant, a BLACKBERRY device, a IPHONE device, and a device including a programmable RFID tag. In some embodiments of system 10, personal device 100 may include processor 300.

Communication network 200 is a network used by lighting controller 400, processor 300, personal device 100, and the individually controllable luminaires 500, to exchange information. The communication network may include, for example, a wired network, or a wireless network or a combination of different wired and wireless networks. Moreover, the communication network can involve different technologies, e.g., infrared communications, fiber optics communications, or computer networking technologies, for example, Ethernet technologies. Communication network 200 can also include a local area network (LAN) or a wireless local area network (WLAN). For example, the communication network can include wireless computer communication technologies between the processor, the lighting controller and the personal device, combined with dedicated hardwired communication technologies between the lighting controller and the one or more individually controllable luminaires.

The term "network" as used herein refers to any interconnection of two or more devices (including lighting controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

Communication network 200 receives signals from personal device 100 and, in response to these signals, transmits an illumination command via link 120. According to some embodiments, the communication network may additionally ascertain information, such as an account number, pertaining to a payment facility associated with the personal device and transfer a fee from the payment facility based on the service order encoded in the first and second signals. In such embodiments, communication network 200 may ascertain information related to the payment facility as a result of the carrier of the personal device providing identifying information such as fingerprint data, a PIN number, or a password.

Communication network 200 receives signals from personal device 100 via link 110, transmits signals to lighting controller 400 via link 120, and transmits signals to and receives signals from processor 300 via link 130. Links 110, 120, and 130 can be considered part of communication network 200. Like other portions of communications network 200, links 110, 120, and 130 can feature a variety of technologies and topologies. In particular, link 130 may feature different technologies or topologies for reception and transmission.

According to some embodiments of system 10, communication network 200 may participate in tracking the movement of personal device 100. For example, the communication network may periodically receive a first signal indicative of the personal device's current location and a second signal corresponding to the current service order associated with the personal device. Based on these updated inputs, the communication network may transmit an updated illumination command via link 120.

According to some embodiments, system 10 features temporally ordering, or prioritizing, service orders received from multiple personal mobile electronic communication devices. For example, communication network 200 may receive a signal including information corresponding to the service order associated with a first personal device 100a, before it receives another signal including information corresponding to the service order associated with a second personal device 100b. Under such circumstances, the system may associate a higher priority with the service order from personal device 100a and a lower priority with the service order from personal device 100*b*. Accordingly, the communication network may transmit a first illumination command indicative of the priority of the service order associated with personal device 100*a* and a second illumination command indicative of the priority of the service order associated with personal device 100*b*.

Lighting controller 400 may receive both illumination commands and proceed to control an illumination proximate to personal device 100*a* using one or more individually controllable luminaires 500 such that the illumination visually indicates not only the service order associated with personal device 100*a* but also its higher priority. Likewise, lighting controller 400 may proceed to control an illumination proximate to personal device 100*b* using one or more individually controllable luminaires 500 such that the illumination visually indicates not only the service order associated with personal device 100*b* but also its lower priority. Similarly, system 10 may prioritize three of more service orders associated with corresponding personal devices.

Alternatively, services order can be temporarily ordered, or prioritized, based on additional or alternative criteria. For example, service orders from certain personal devices may be assigned higher or lower priority. Similarly, services orders from personal devices in certain locations may be assigned higher or lower priority. For example, service orders from personal devices recognized as associated with regular patrons may be assigned higher priorities as compared to service orders from personal devices not so recognized. And service orders from personal devices recognized to be located within priority zones or booths may be assigned higher priorities as compared to services orders from other regions within the same establishment.

Processor 300 approximately ascertains the location of each personal device 100 upon receiving first signals indicative of the locations of these personal devices through communication network 200. The processor may ascertain these locations by utilizing technologies such as GPS, assisted GPS, triangulation, signal strength analysis, and accelerometer technology, or combinations of one of more of the foregoing technologies.

The term "processor" as used herein refers to any circuitry that processes arithmetic and logic instructions, such as a central processing unit of a computer capable of manipulating information. Embodiments of processor 300 include, but are not limited to, conventional microprocessors, application specific integrated circuits (ASICs), and field-programmable gate arrays (FPGAs).

Lighting controller 400 receives the illumination command from communication network 200 via link 120, and, in response to the illumination command, controls an illumination proximate to the personal device using the one or more individually-controllable luminaires 500 in a lighting network such that the illumination proximate to personal device 100 visually indicates the service order associated with it. The illumination proximate to the personal device may visually indicate other information, such as the priority of the service order. Moreover, the lighting controller may receive multiple illumination commands from communication network 200 via link 120.

The term "lighting controller" is used herein generally to describe various apparatus relating to the operation of one or more luminaires. A lighting controller can be implemented in numerous ways. For example, a controller may be implemented using dedicated hardware, a controller that employs one or more processors may be programmed using software (e.g., microcode) to perform various functions, and a controller may be implemented as a combination of dedicated hardware and one or more processors. Examples of controller components that may be employed in various embodiments of the present disclosure include, but are not limited to, conventional microprocessors, application specific integrated circuits (ASICs), and field-programmable gate arrays (FPGAs).

According to some embodiments, lighting controller 400 controls the illumination proximate to personal device 100 by creating a visible light effect near or on a surface, such as a ceiling or a floor, proximate to the personal device. In other embodiments, the lighting controller additionally participates in tracking the movement of personal device 100. For example, after communication network 200 receives an updated signal via link 110 indicative of the personal device's current location and service order and transmits an updated illumination command via link 120, the lighting controller may receive the updated illumination command via link 120 from the communication network and control an illumination proximate to the current location of the personal device such that the illumination visually indicates the service order and possibly other information.

In some other embodiments, lighting controller 400 may participate, along with at least personal device 100, a second personal mobile electronic communication device, and communication network 200, in temporally ordering service orders received from the personal device. For example, after the communication network receives a signal including a service order associated with the personal device, communication network 200 may subsequently receive another signal from a second personal device, this signal including information corresponding to a service order associated with the second personal device. The communication network may associate a first priority with the service order associated with one personal device and a second, lower priority, with the service order associated with another personal device before transmitting an illumination command associated with the service order corresponding to the first personal device via link 120 and a second illumination command associated with the service order associated with the other personal device via link 120. In such embodiments, lighting controller 400 may receive both illumination commands and proceed to control an illumination proximate to the first personal device using one or more individually controllable luminaires 500 such that the illumination visually indicates not only the service order associated with that personal device, but also indicates that this personal device's service order is associated with a first priority and is scheduled to be serviced next. Likewise, the lighting controller may proceed to control an illumination proximate to the second personal device using the one or more individually controllable luminaires such that the illumination visually indicates not only the service order associated with the second personal device but also indicates that the second personal device's service order is associated with a lower second priority and is not scheduled to be serviced next.

Individually-controllable luminaires 500 are used by the lighting controller to control an illumination proximate to personal device 100 such that the illumination visually indicates the service order associated with that personal device. In some embodiments, these individually controllable luminaires include one or more luminaires that are installed in fixed locations, and are capable of communicating with lighting controller 400 via a lighting network. The lighting network may be composed of, for example, dedicated hardware communication links. In some other embodiments, luminaires 500 include one or more addressable luminaires which communicate through a lighting network that includes other types of communication links, for example, an Ethernet or a wireless network connection. The communications between lighting controller 400 and luminaires 500 can include commands sent from lighting controller 400 to luminaires 500. These commands can cause one or more of the luminaires 500 to, for example, turn on, turn off, decrease or increase intensity, or change the spectral power distribution of their illumination.

According to some embodiments, the illumination proximate to personal device 100 created by luminaires 500 may be visible only through the use of technology comprising polarized spectacles and electronically shuttered spectacles. For example, luminaires 500 may repeatedly generate light pulses, technologies such as electronically shuttered spectacles may be synchronized to block the same slice of each lighting period, and luminaires 500 may be configured to shift one or more light pulses into the time slice that is shuttered or blocked.

According to some other embodiments, the illumination proximate to personal device 100 from luminaires 500 may comprise, for example, a single color light and/or a sequence of lights having different colors. For example, the illumination proximate to personal device 100 may use only a single color light to visually indicate the service order associated with such personal device. The illumination may also utilize more than one color of light or a repeating sequence of differently colored lights to visually represent the service order associated with the personal device.

In yet other embodiments, the illumination proximate to personal device 100 created by luminaires 500 may be encoded with a modulated signal corresponding to the service order associated with personal device 100. In such an embodiment, the personal device may employ at least one sensor for detecting the modulated signal as well as the ability to capture the modulated signal. In such an embodiment, signal 110 may include the modulated signal detected and captured by the personal device.

The term "luminaire" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given luminaire may be configured to generate electromagnetic radiation within the visible spectrum, outside the visible spectrum, or a combination of both. Hence, the terms "light" and "radiation" are used interchangeably herein. Additionally, a luminaire may include as an integral component one or more filters (e.g., color filters), lenses, or other optical components. Also, it should be understood that luminaires may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more luminaires. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources). The term "spectral power distribution" is understood to refer to the power per unit area per unit wavelength of an illumination, or the per-wavelength contribution to any radiometric quantity (e.g. radiant energy, radiant flux, radiant intensity, radiance, irradiance, radiant exitance, or radiosity).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the term "different colors" implicitly refers to multiple spectra having different wavelength components and/or bandwidths. It also should be appreciated that the term "color" may be used in connection with both white and non-white light.

Figure 2:
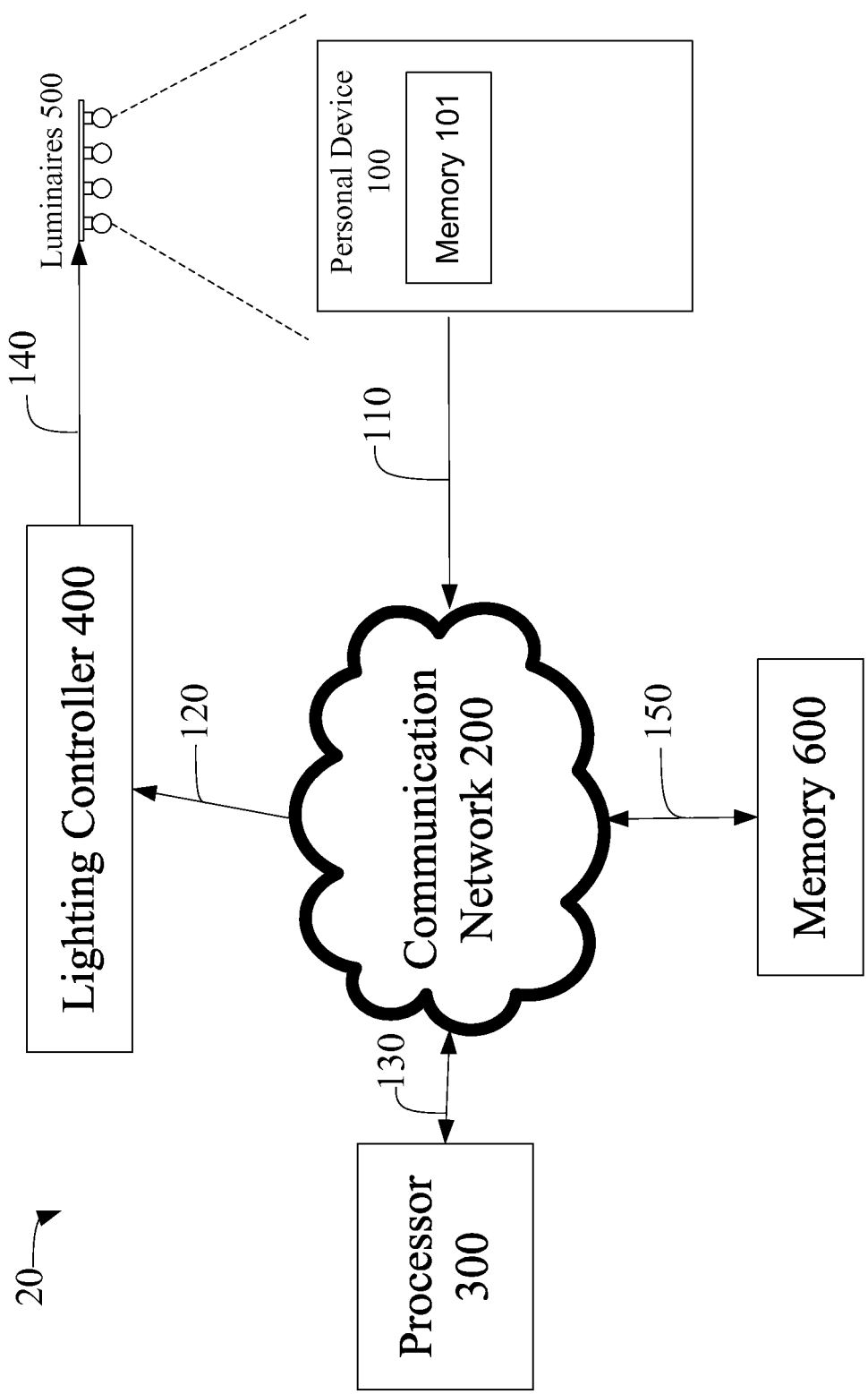
FIG. 2 illustrates a light-based system for communicating service orders according to some embodiments of the invention.

FIG. 2 illustrates a light-based system 20 for communicating service orders according to some embodiments of the invention. System 20 includes personal mobile electronic communication device (personal device) 100, communication network 200, memory 600, processor 300, and lighting controller 400 used with one or more individually controllable luminaires 500 in a lighting network. As illustrated in FIG. 2, personal device 100, according to some embodiments, features memory 101.

Embodiments of memory 101 and memory 600 include various types of storage media, e.g., volatile and non-volatile computer memory such as RAM, PROM, EPROM and EEPROM, floppy disks, compact disks, optical disks, magnetic tape. In some implementations, the storage media may be encoded with one or more programs capable of being executed on a processor. Various storage media may be transportable, such that the one or more programs stored thereon can be loaded into a processor so as to implement various aspects of the present invention discussed herein. The terms "program" or "computer program" are used herein in a generic sense to refer to any type of computer code (e.g. software or microcode) that can be employed to program one or more processors.

In some embodiments of system 20, personal device 100 transmits first and second signals via link 110, where the first signal relates to the location of personal device 100 and the second signal corresponds to a service order associated with personal device 100. Personal device 100 can be any type of personal mobile electronic communication device described with respect to personal device 100 of FIG. 1.

In such embodiments, memory 101 may store, for example, associations between service orders and venues, associations between service orders and times of the day, or simply one or more service orders associated with personal device 100. The service order transmitted via link 110 may have been retrieved from memory 101.

In some embodiments of system 20, communication network 200 receives signals via link 110 from the personal device and, in response, queries and retrieves via link 150 from memory 600, an illumination setting associated with the service order received via link 110. In such embodiments, communication network 200 may then transmit an illumination command via link 120. Communication network 200 can be any type of communication network described with respect to communication network 200 of FIG. 1.

In some embodiments of system 20, processor 300 approximately ascertains the location of personal device 100 upon receiving via link 130 from communication network 200, information indicative of the location of the personal device. The processor 300 can be any type of processor described above in connection with FIG. 1.

As FIG. 2 illustrates, in some embodiments, lighting controller 400 receives the illumination command via link 120 generated by communication network 200 and, in response, controls an illumination proximate to personal device 100 using one or more individually controllable luminaires 500 in a lighting network. The lighting controller 400 can be any type of lighting controller described above in connection with FIG. 1.

Individually controllable luminaires 500 are used by the lighting controller 400 to control an illumination proximate to the personal mobile electronic communication device 100 such that the illumination visually indicates the service order associated with personal device 100. In some embodiments, individually controllable luminaires 500 control the illumination proximate to personal device 100 by implementing the light setting that was previously retrieved from memory 600 and incorporated into the illumination command generated by communication network 200. In such embodiments, "implementing" a light setting may involve responding to commands from the lighting controller. These commands may cause some of luminaires 500 to, for example, turn on, turn off, or decrease or increase intensity, or change the spectral power distribution of their illumination. Additionally, individually controllable luminaires 500 may involve any type of the one or more individually controllable luminaires described above in connection with FIG. 1.

Figure 3A:
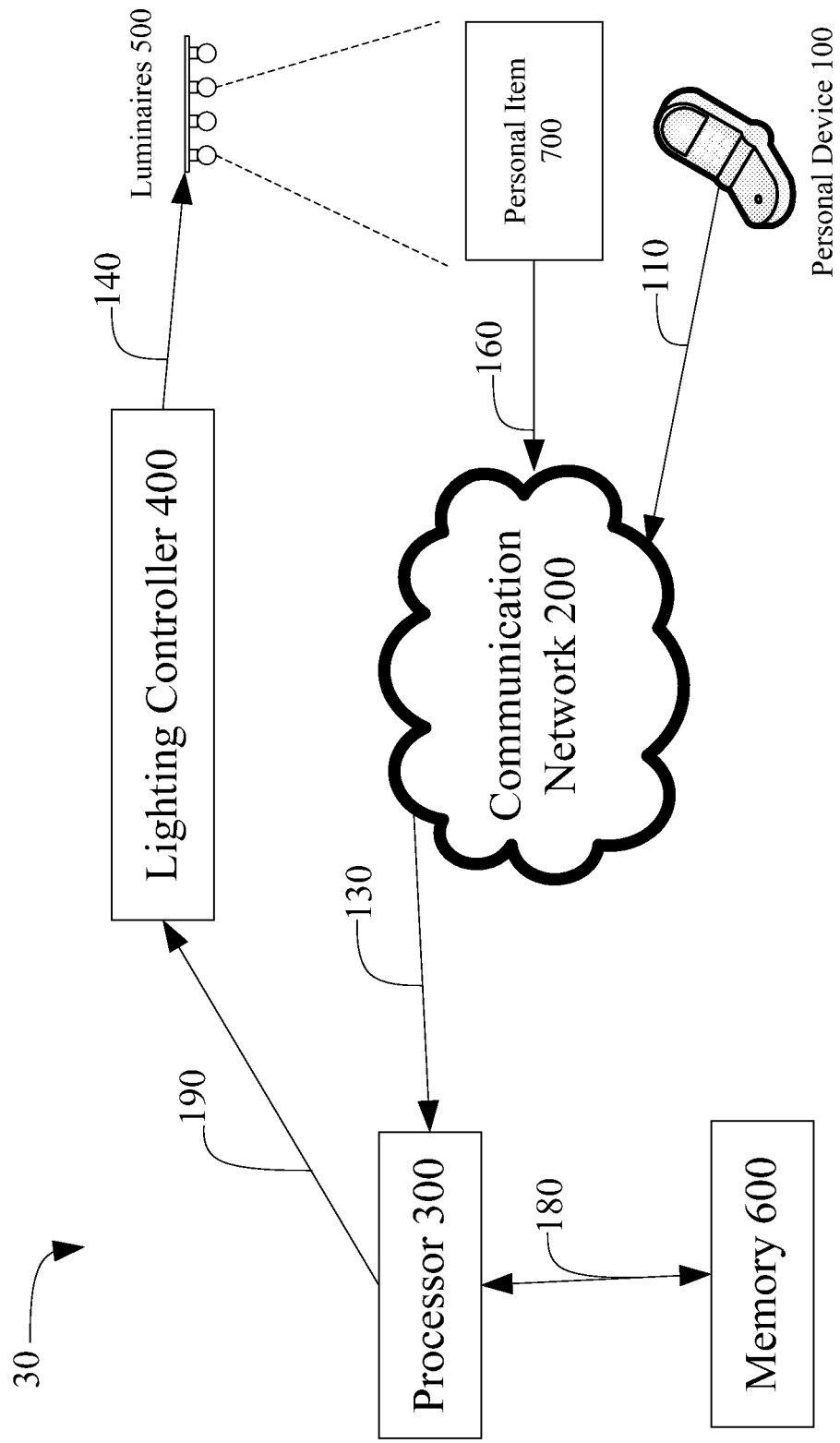
FIG. 3A illustrates a light-based system for identifying personal items according to some embodiments of the invention.

FIG. 3A illustrates a light-based system 30 for identifying personal items according to some embodiments of the invention. System 30 includes personal mobile electronic communication device (personal device) 100, personal item 700, communication network 200, memory 600, processor 300, lighting controller 400, and one or more individually-controllable luminaires 500 in a lighting network.

As illustrated in FIG. 3A, personal device 100 transmits a first signal indicative of a device identifier via link 110. Personal item 700 transmits a second signal indicative of an item identifier via link 160. Personal device 100 can be any type of personal mobile electronic communication device described with respect to personal device 100 of FIG. 1. In some embodiments, personal item 700 may include, for example, objects embedded with an RFID tag.

An "RFID tag" as used herein includes any object that can be incorporated into any other object in order that the object incorporating the RFID tag may be tracked using radio waves. In some embodiments, an RFID tag may contain at least two parts: a first part involving an integrated circuit for performing such functions as modulating and demodulating radio frequency signals, and a second part involving an antenna for receiving and transmitting radio-frequency signals. Additionally, an RFID tag may be passive or active.

Communication network 200 receives the first signal via link 110 from personal device 100 and receives the second signal via link 160 from the personal item 700. Link 160 can be any type of link described with respect to link 130 of FIG. 1. In some embodiments, the communication network determines the device identifier associated with personal device 100 from the first signal and determines the item identifier associated with personal item 700 from the second signal, before transmitting both the device identifier and the item identifier to processor 300 via link 130. Additionally, communication network 200 can be any type of communication network described with respect to communication network 200 of FIG. 1.

In some embodiments of system 30, memory 600 associates device identifiers with item identifiers. In other embodiments, the memory may have a different relationship to the elements in the system.

In some embodiments, processor 300 approximately ascertains the location of the personal device 100 upon receiving, via link 130, from communication network 200, information indicative of the location of the personal device. The processor may also query, via link 180, memory 600 for an association between the device identifier and the item identifier received via link 130 from the communication network. The processor may then generate and transmit an illumination command via link 190, where the illumination command is dependent upon the result of the query made via link 180. The processor 300 can be any type of processor described above in connection with FIG. 1. Links 180, and 190 can be any type of link described with respect to link 130 of FIG. 1.

In some embodiments of system 30, lighting controller 400 receives the illumination command via link 190 and in response, controls, via link 140, an illumination proximate to personal item 700 via one or more individually controllable luminaires 500 in a lighting network. In such embodiments, lighting controller 400 controls an illumination proximate to personal item 700 such that the illumination visually indicates the existence of an association in memory 600 between personal item 700 and personal device 100. Moreover, lighting controller 400 can be any type of lighting controller described with respect to lighting controller 400 of FIG. 1.

Individually-controllable luminaires 500 are used by lighting controller 400 to control an illumination proximate to personal item 700 such that the illumination visually indicates the existence of an association in memory 600 between personal item 700 and personal device 100. Individually-controllable luminaires 500 may involve any type of the one or more individually controllable luminaires described above in connection with FIG. 1.

In some embodiments, the one or more individually-controllable luminaires 500 may include one or more LEDs embedded within personal item 700. In other embodiments, the one or more LEDs may be constructed to be energy conscious. For example, the one or more LEDs may be powered by one or more inductively charged energy storage components or the one or more LEDs may be required to remain switched off until proximate to personal device 100.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

In some embodiments of system 30, lighting controller 400 further controls, via link 140, the illumination proximate to personal item 700, to visually indicate the existence of an association in memory 600 between personal item 700 and personal device 100, by requiring that the individually-controllable luminaires 500 create a first colored illumination to signify the existence of an association between the personal item 700 and personal device 100 and a second colored illumination to signify the lack of such an association.

In other embodiments of system 30, personal device 100 transmits a mode signal encoding a lighting scheme according to which personal item 700 is to be illuminated. The lighting scheme may, for example, dictate the use of a specific colored illumination or the use of a sequence of colored illuminations.

In some other embodiments of system 30, processor 300 may generate a sound command based on whether or not an association between personal device 100 and personal item 700 exists in memory 600. According to such embodiments, system 30 may further include a sound controller that receives the sound command from the processor and controls a sound proximate to the personal item such that the sound indicates whether or not an association exists in memory 600 between the personal item and the personal device.

Figure 3B:
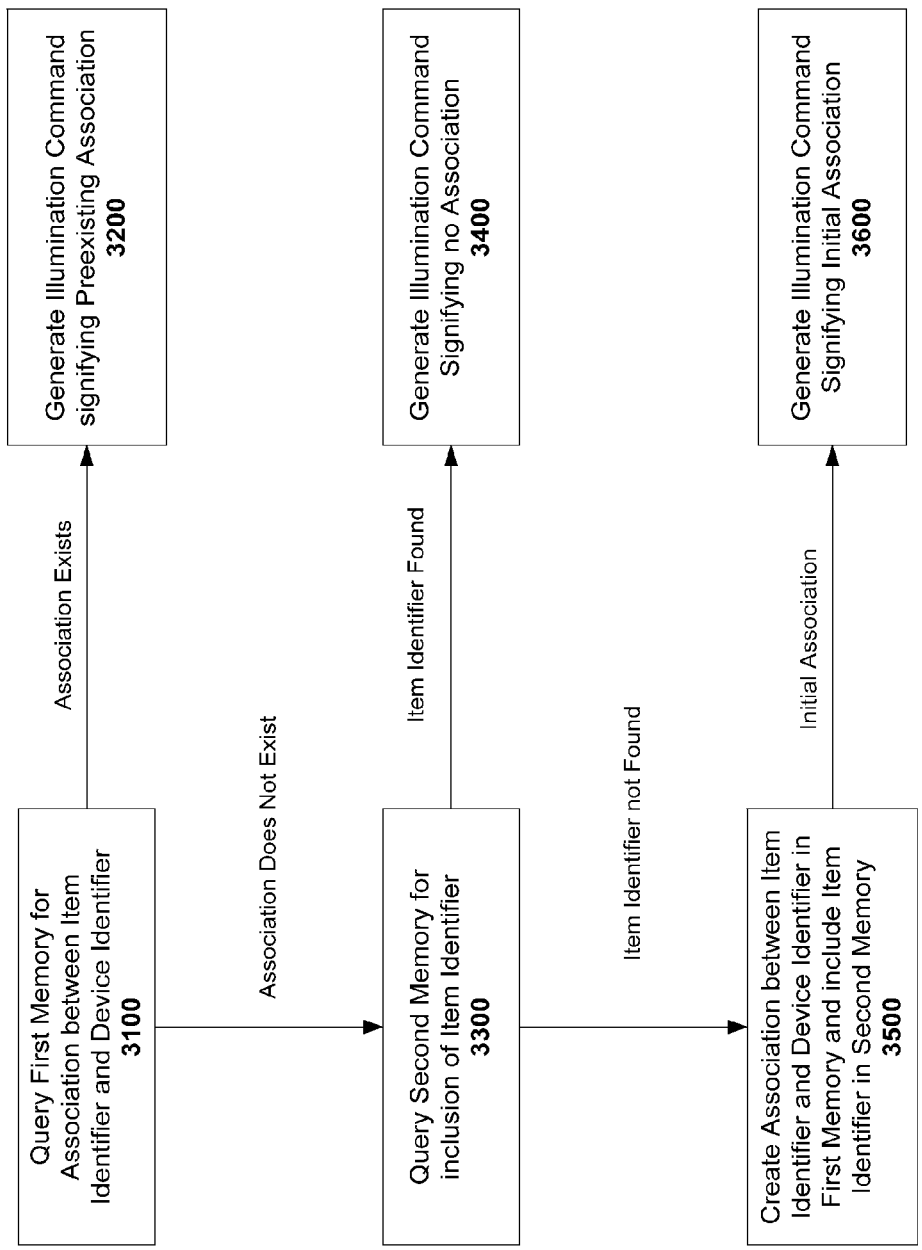
FIG. 3B illustrates exemplary steps executed by one or more components included in the embodiment of the light-based system illustrated in FIG. 3A.

FIG. 3B illustrates aspects of embodiments of system 30 that participate in creating initial associations between device identifiers and item identifiers. As depicted in FIG. 3B, a first memory is queried for an association between the device identifier and the item identifier (3100). The first memory queried may comprise, for example, memory 600. If the response to the query indicates the existence of an association between the device identifier and item identifier, an illumination command may be generated to signify a pre-existing association between the item identifier and the device identifier (3200). If, however, there is an indication that an association between the item identifier and the device identifier does not exist in the first memory, a second memory may be queried to determine if the item identifier is in included in the second memory (3300). In such an embodiment, if there is in an indication that the item identifier is included in the second memory, an illumination command signifying no association between the item identifier and the device identifier may be generated (3400). If, alternatively, there is in an indication that the item identifier is not included in the second memory, an association between the item identifier and the device identifier may be created in the first memory and the item identifier may be included in the second memory (3500). After that, an illumination command, signifying an initial association in the first memory between the item identifier and device identifier, may be generated (3600).

In some other embodiments of system 30, the communication network 200 further identifies the device identifier received from personal device 100 as associated with a non-patron before transmitting the item identifier to processor 300. In such embodiments, the processor 300 may then further query, via link 180, memory 600 for the existence of an association involving the item identifier. If the result of query via link 180 indicates that an association involving the item identifier exists in memory 600, processor 300 may delete the association involving the item identifier from memory 600 and generate an illumination command signifying an unassociated personal item ready for re-association with a personal device.

According to some embodiments of system 30, system 30 comprises a user interface for entering item identifiers into memory 101. The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

Figure 4A:
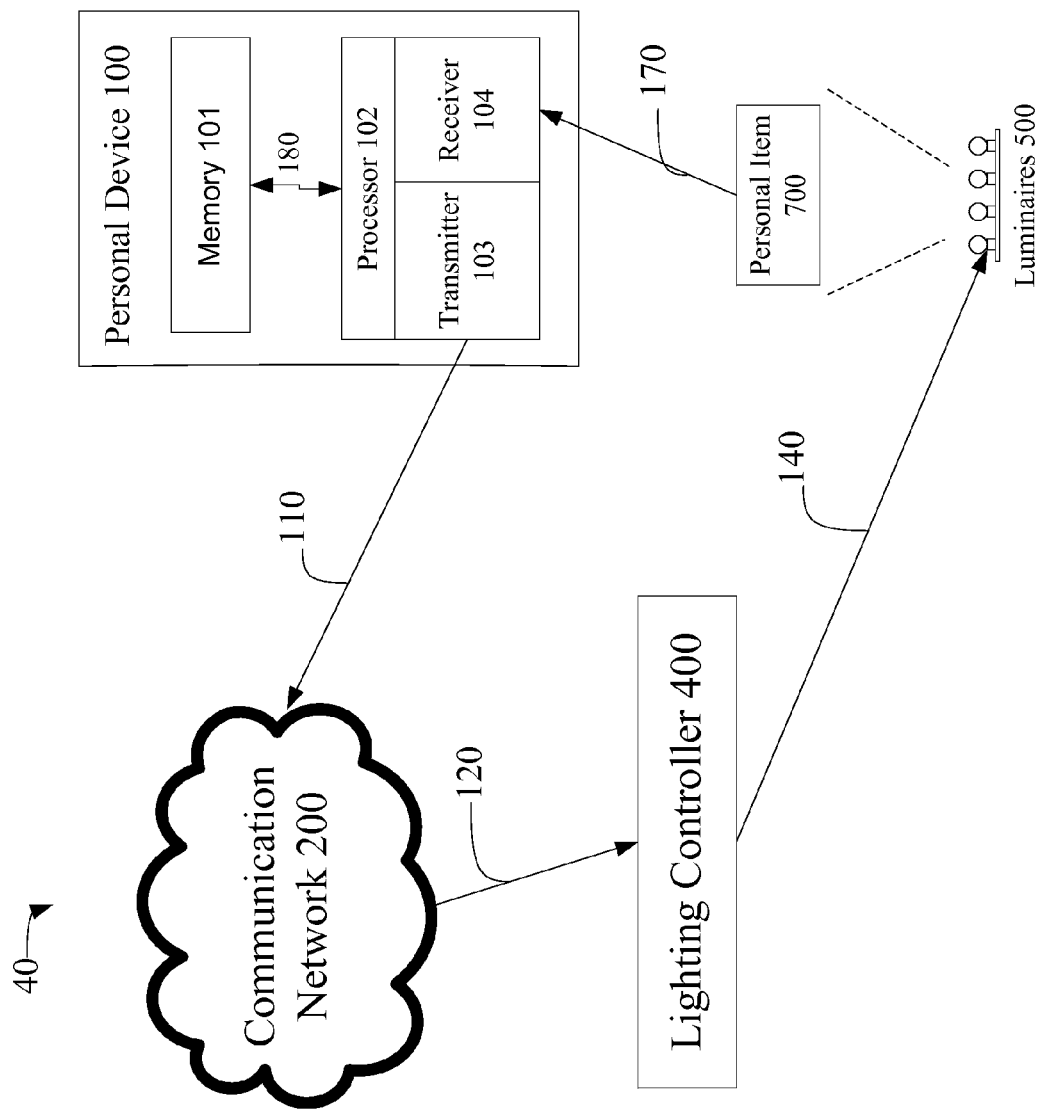
FIG. 4A illustrates a light-based system for identifying personal items according to an embodiment of the invention.

FIG. 4A illustrates a light-based system 40 for communicating service orders according to some embodiments of the invention. System 40 includes personal mobile electronic communication device (personal device) 100, personal item 700, communication network 200, lighting controller 400, and one or more individually-controllable luminaires 500 in a lighting network.

As illustrated in FIG. 4A, personal device 100 includes memory 101, processor 102, transmitter 103, and receiver 104. The personal device can be any type of personal device described with respect to personal device 100 of FIG. 1.

Memory 101 stores one or more item identifiers associated with personal device 100. Memory 101 can also be any type of memory described with respect to memory 101 of FIG. 2.

According to some embodiments of system 40, personal item 700 transmits a signal encoding an item identifier via link 170. Link 170 can be any type of link described with respect to link 130 of FIG. 1. Personal item 700 can be any type of personal item described with respect to personal item 700 of FIG. 3.

Receiver 104 receives the signal transmitted by personal item 700 via link 170. Processor 102 determines the item identifier encoded in the signal received via link 170 and queries, via link 180, memory 101 to determine if memory 101 includes the item identifier. Based on the result of the query, processor 102 generates a report and transmitter 103 transmits one or more signals encoding the report and information indicative of the location of personal device 100 via link 110. Processor 102 can be any type of processor described with respect to processor 300 of FIG. 1.

Communication network 200 receives the one or more signals via link 110 from transmitter 103 and transmits, in response, an illumination command via link 120. Communication network 200 can be any type of communication network described with respect to communication network 200 of FIG. 1. According to some embodiments, the communication network, receiving the one or more signals incorporating information indicative of the location of personal device 100, approximately ascertains the location of this personal device using technology including GPS, assisted GPS, triangulation, signal strength analysis and accelerometer technology. In some embodiments of system 40, a second processor, communicatively coupled to communication network 200 generates and transmits the illumination command.

Lighting controller 400, receiving the illumination command, controls, via link 140, an illumination proximate to personal item 700 using one or more individually-controllable luminaires 500 in a lighting network. Lighting controller 400 can be any type of lighting controller described with respect to lighting controller 400 of FIG. 1.

The individually-controllable luminaires 500 are used by lighting controller 400 to control an illumination proximate to personal item 700 such that the illumination visually indicates that the item identifier transmitted via link 170 and associated with personal item 700, is included within memory 101 of personal device 100. Additionally, individually-controllable luminaires 500 may involve any type of the one or more individually controllable luminaires described with respect to luminaires 500 of FIG. 1.

According to some embodiments of system 40, system 40 comprises a user interface for entering item identifiers into memory 101. The user interface can be any type of user interface described with respect to FIG. 3.

Figure 4B:
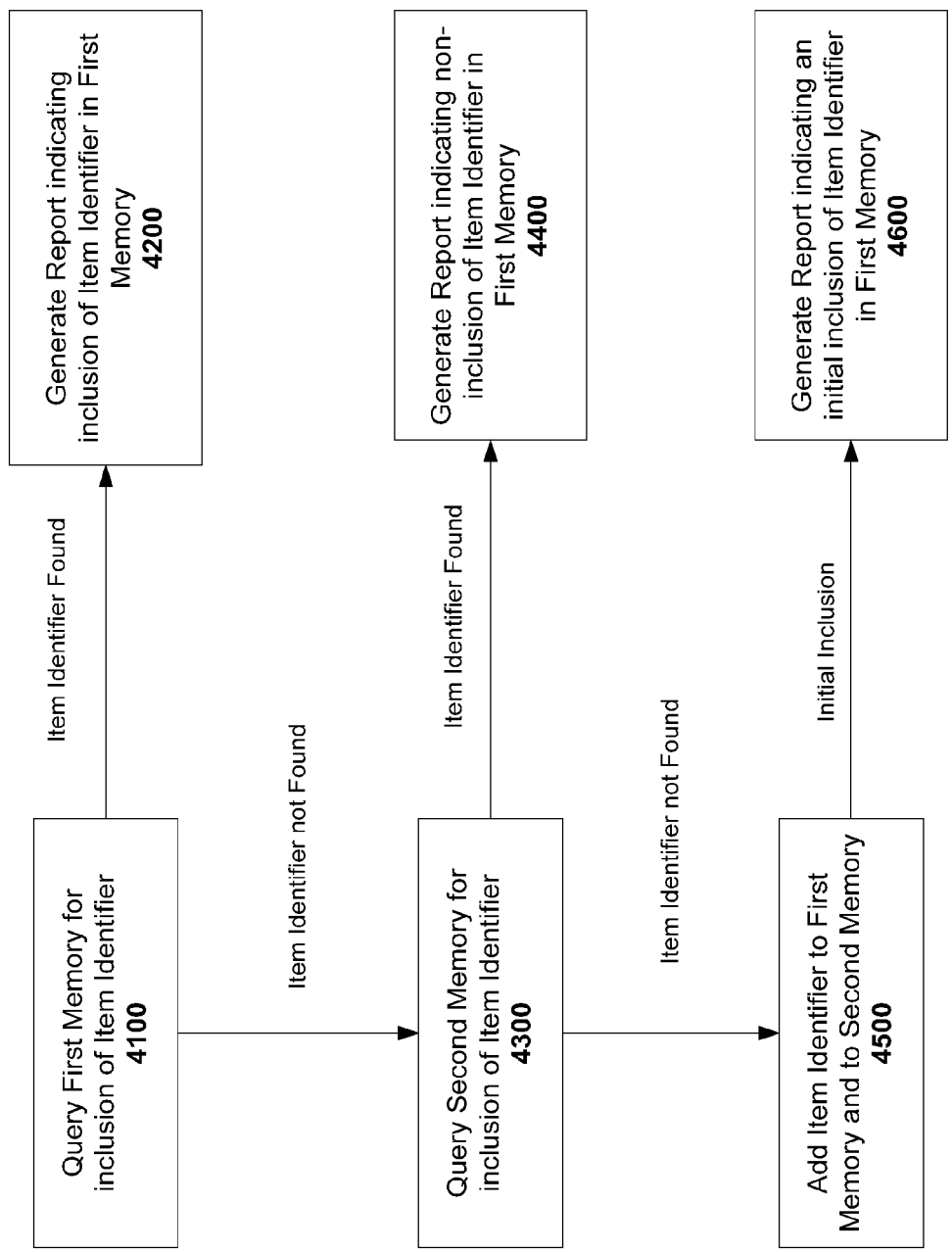
FIG. 4B illustrates exemplary steps executed by one or more components included in an embodiment of the light-based system illustrated in FIG. 4A.

Additionally or alternatively, in embodiments of system 40, processor 102 can participate in adding item identifiers to memory 101 within personal device 100. FIG. 4B illustrates such an embodiment. As illustrated in FIG. 4B, a first memory is queried to determine if the item identifier transmitted by personal item 700 is included in the first memory (4100). The first memory may employ memory 101 included within personal device 100. If the query results in an indication that the first memory contains the item identifier, a report may be generated to indicate the inclusion of the item identifier associated with personal item 700 within the first memory (4200). Alternatively, if the query results in an indication that the first memory does not contain the item identifier, a second memory may be queried via communication network 200, in order to determine if the item identifier transmitted by the personal item is included in the second memory (4300). If the query of the second memory results in an indication that the second memory contains the item identifier, then a report may be generated to indicate that first memory does not include the item identifier associated with personal item 700 (4400). Alternatively, if there is an indication that the second memory does not contain the item identifier associated with personal item 700, the item identifier may be added to both the first and the second memories (4500). After that, a report also may be generated to indicate the initial inclusion of the item identifier associated with the personal item within the first memory (4600).

Figure 5:
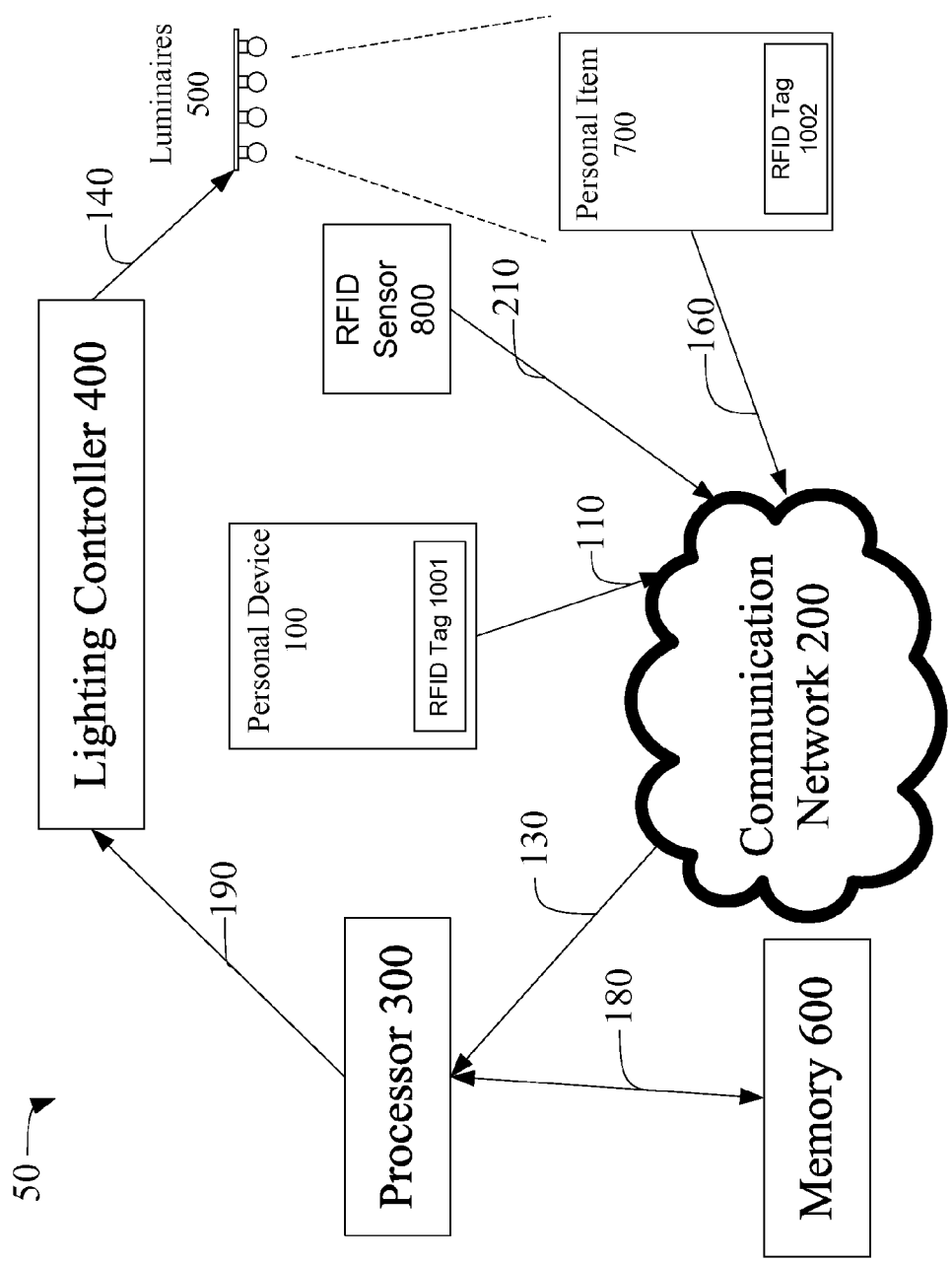
FIG. 5 illustrates a light-based system for identifying personal items according to some embodiments of the invention.

FIG. 5 illustrates a light-based system 50 for identifying personal items according to some embodiments of the invention. System 50 includes personal mobile electronic communication device (personal device) 100, personal item 700, RFID sensor 800, communication network 200, memory 600, processor 300, lighting controller 400, and one or more individually controllable luminaires 500 in a lighting network.

As depicted in FIG. 5, personal device 100 includes RFID tag 1001. Personal device 100 can be any type of personal device described with respect to personal device 100 of FIG. 1. RFID tag 1001 can be any type of RFID tag described with respect to personal item 700 in FIG. 3. Additionally, the personal device transmits signal indicative of a device identifier associated with itself via link 110.

As depicted in FIG. 5, personal item 700 includes RFID tag 1002. Again, RFID tag 1002 can be any type of RFID tag described with respect to personal item 700 in FIG. 3. Personal item 700 transmits a signal indicative of an item identifier associated with itself via link 160. Additionally, the personal item can be any type of personal item described with respect to personal item 700 in FIG. 3.

Also as depicted in FIG. 5, system 50 includes at least one RFID sensor 800. RFID sensor 800 detects the proximity of RFID tag 1001 included within personal device 100 and RFID tag 1002 included within personal item 700, and transmits a signal indicative of its own location via link 210.

Communication network 200 receives the signal via link 110 from personal device 100, the signal via link 210 from the RFID sensor 800, and the signal via link 160 from personal item 700. In some embodiments, the communication network determines the device identifier associated with the personal device from the signal received via link 110 and determines the item identifier associated with personal item 700 from the signal received via link 160. In such embodiments, communication network 200 then transmits via link 130 the device identifier, the item identifier, and information indicative of the location of the RFID sensor 800. Communication network 200 can be any type of communication network described with respect to communication network 200 of FIG. 1.

Memory 600 associates device identifiers with item identifiers. Additionally, memory 600 can be any type of memory described with respect to memory 600 of FIG. 2.

Processor 300 approximately ascertains the location of personal device 100 upon receiving, via link 130, from communication network 200, information indicative of the location of the RFID sensor 800. The processor also queries memory 600, via link 180, for an association between the device identifier and the item identifier received via link 130 from communication network 200, before generating and transmitting, via link 190, an illumination command based upon the result of the query. Processor 300 can be any type of processor described with respect to processor 300 of FIG. 1.

Lighting controller 400 receives the illumination command transmitted via link 190 and, in response, controls, via link 140, an illumination proximate to personal item 700 via one or more individually controllable luminaires 500 in a lighting network. In some embodiments, lighting controller 400 controls the illumination such that the illumination visually indicates the existence of an association in memory 600 between the item identifier associated with personal item 700 and the device identifier associated with personal device 100. Additionally, lighting controller 400 can be any type of lighting controller described with respect to lighting controller 400 of FIG. 1.

Individually controllable luminaires 500 are used by lighting controller 400 to control an illumination proximate to personal item 700. Additionally, individually controllable luminaires 500 may involve any type of the one or more individually controllable luminaires described with respect to luminaires 500 of FIG. 1.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Also, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A light-based system for identifying personal items comprising:
   a personal mobile electronic communication device transmitting a first signal for indicating a device identifier;
   a processor approximately ascertaining the location of the personal mobile electronic communication device by a GPS or signal analysis technology;
   a personal item transmitting a second signal for indicating an item identifier;
   a memory associating the device identifier with the item identifier;
   a communication network receiving the first signal from the personal mobile electronic communication device and the second signal from the personal item, determining the device identifier from the first signal and the item identifier from the second signal, and transmitting the device identifier and the item identifier to the processor, wherein the processor checks the memory for an association between the device identifier and the item identifier, and generates an illumination command dependent on the association;

a lighting controller separate from the personal mobile electronic communication device and personal item and operably controlling a plurality of luminaires in a room, receiving the illumination command and, in response to the illumination command, controlling an illumination proximate to the personal item by at least one individually-controllable luminaire of the plurality of luminaires in a lighting network such that the illumination proximate to the personal item visually indicates the association between the personal item and the personal mobile electronic communication device; and wherein the lighting controller further controls the illumination to visually indicate the association in the memory with a first illumination and to visually indicate a lack of association in the memory with a second illumination different than the first illumination.

2. The light-based system of claim 1, further comprising a user interface for entering the association between the device identifier and the item identifier into the memory.

3. The light-based system of claim 1, wherein the processor generates a sound command dependent on the association, and wherein a sound controller receives the sound command and controls a sound proximate to the personal item such that the sound indicates the association between the personal item and the personal mobile electronic communication device.

4. The light-based system of claim 1, wherein the processor, after checking the memory for an association between the device identifier and the item identifier and failing to find the association, further checks a second memory for the item identifier, creating an initial association between the device identifier and the item identifier in the memory and adding the item identifier to the second memory when the second memory does not contain the item identifier, and further generates a further illumination command based on the initial association, and the lighting controller receiving the further illumination command, controls a further illumination proximate to the personal item such that the further illumination visually indicates the initial association between the personal item and the personal mobile electronic communication device.

5. The light-based system of claim 1, wherein the personal mobile electronic communication device further transmits a mode signal, the mode signal encoding a lighting scheme by which to illuminate the personal item, the lighting scheme comprising the use of lights in one or more colors and the use of a sequence of colored-lights, and wherein the lighting controller controls the illumination proximate to the personal item to visually indicate the association between the personal item and the personal mobile electronic communication device such that the illumination is consistent with the lighting scheme encoded in the mode single.

6. The light-based system of claim 1, wherein the communication network further identifies the device identifier as associated with a non-patron before transmitting the item identifier to the processor, and wherein the processor further checks the memory for a second association involving the item identifier and deletes the second association from the memory.

7. The light-based system of claim 1, wherein the personal item includes one or more light emitting diodes and the at least one individually controllable luminaire comprises the one or more light emitting diodes.

8. A light-based system for identifying personal items comprising:

a personal item transmitting a first signal encoding a first item identifier;

a personal mobile electronic communication device, wherein the personal mobile electronic communication device comprises a memory storing the first item identifier;

a receiver receiving the first signal from the first personal item, a processor determining the first item identifier from the first signal, checking the memory for the first item identifier, and generating a report dependent on storage of the first item identifier in the memory; and a transmitter transmitting a second signal encoding the report and a third signal for indicating a location of the personal mobile electronic communication device; and a communication network receiving the second signal and the third signal from the personal mobile electronic communication device and transmitting an illumination command; and a lighting controller separate from the personal item and the personal mobile electronic communication device for controlling a plurality of luminaires for overhead lighting in a room and receiving the illumination command and, in response to the illumination command, controlling an illumination proximate to the personal item by at least one of the plurality of individually-controllable luminaires in a lighting network such that the illumination proximate to the personal item visually indicates the inclusion of the item identifier in the memory of the personal mobile electronic communication device and, wherein the illumination command is generated by a second processor communicatively coupled to the communication network.

9. The light-based system of claim 8, further comprising a user interface for entering the item identifier into the memory.

10. The light-based system of claim 8, wherein the communication network receiving the third signal from the personal mobile electronic communication device approximately ascertains the location of the personal mobile electronic communication device by a technology consisting of at least one of GPS, assisted GPS, triangulation, signal strength analysis, and accelerometer technology.

11. The light-based system of claim 8, wherein the processor, after checking the memory for the item identifier and failing to find the item identifier in the memory, checks a second memory via the communication network for the item identifier, and adds the item identifier to the memory in the event that the second memory does not contain the item identifier.

12. A light-based system for identifying personal items comprising:

a personal mobile electronic communication device for transmitting a first signal for indicating an item identifier;

a processor for at least approximately ascertaining the location of the personal mobile electronic communication device;

a memory for associating the item identifier with an item location for a personal item;

a communication network for receiving the first signal from the personal mobile electronic communication device, for determining the item identifier from the first signal, and for transmitting the item identifier to the processor, wherein the processor checks the memory for the presence of the item location associated with the item identifier and generates an illumination command based upon the association; and a lighting controller controlling a plurality of individually controllable luminaires in a lighting network and separate from the personal item, the lighting controller operable to control the plurality of luminaires in a room containing the personal item, the lighting controller operable for receiving the illumination command and, in response to the illumination command, for controlling a first illumination from a first luminaire in the lighting network proximate to the personal item and a second illumination from a second luminaire in the lighting network proximate to the personal mobile electronic communication device for visually indicating a link between the personal item and the personal mobile electronic communication device using the first illumination and the second illumination.

13. The light-based system of claim 12, further comprising a pair of electronically shuttered spectacles for making the illumination visible and for blocking vision using time slices and light pulses introduced into the blocked time slices.

* * * * *